United States Patent
Ohkawa

(10) Patent No.: US 7,916,345 B2
(45) Date of Patent: Mar. 29, 2011

(54) IMAGE PROCESSING WITH AN ADJUSTMENT TO A BINARY IMAGE LINE

(75) Inventor: Mieko Ohkawa, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 934 days.

(21) Appl. No.: 11/774,040

(22) Filed: Jul. 6, 2007

(65) Prior Publication Data

US 2008/0018919 A1 Jan. 24, 2008

(30) Foreign Application Priority Data

Jul. 24, 2006 (JP) ................................. 2006-200363

(51) Int. Cl.
*G06K 15/00* (2006.01)
(52) U.S. Cl. ........................................ 358/1.9; 382/258
(58) Field of Classification Search .................. 382/258; 358/1.9
See application file for complete search history.

(56) References Cited

U.S. PATENT DOCUMENTS

| | | | | |
|---|---|---|---|---|
| 5,224,179 A | * | 6/1993 | Denker et al. | 382/259 |
| 5,483,351 A | * | 1/1996 | Mailloux et al. | 358/3.27 |
| 5,537,484 A | * | 7/1996 | Kobayashi | 382/124 |
| 6,993,184 B2 | * | 1/2006 | Matsugu | 382/173 |
| 7,408,672 B2 | * | 8/2008 | Ito | 358/1.2 |

FOREIGN PATENT DOCUMENTS

JP 02-268374 A 11/1990
* cited by examiner

*Primary Examiner* — Bhavesh M Mehta
*Assistant Examiner* — Stephen R Koziol
(74) *Attorney, Agent, or Firm* — Buchanan Ingersoll & Rooney PC

(57) ABSTRACT

There is described an image processing apparatus, which makes it possible to easily adjust a width of a line image without deteriorating the image quality of the line image. The apparatus includes a storage section to store a first template and a second template; a first determining section to determine whether or not a target pixel is the specific pixel, based on the first template; a second determining section to determine whether or not the target pixel is the edge pixel, based on the second template; and a line width adjusting section to adjust the width of the line image. When determining that the target pixel is the specific pixel, the target pixel is converted to a black pixel. When determining that the target pixel is not the specific pixel and the target pixel is the edge pixel, the target pixel is converted to a white pixel.

10 Claims, 11 Drawing Sheets

No.00:CONVERSION VALUE = BLACK / SYMMETRY INFORMATION SW = 1

No.01:CONVERSION VALUE = BLACK / SYMMETRY INFORMATION SW = 1

No.02:CONVERSION VALUE = WHITE / SYMMETRY INFORMATION SW = 1

7 PIXEL
11 PIXEL    CENTRAL POSITION

No.03:CONVERSION VALUE = WHITE / SYMMETRY INFORMATION SW = 1

FIG. 4 (a)
No.04: CONVERSION VALUE = BLACK / SYMMETRY INFORMATION SW = 15
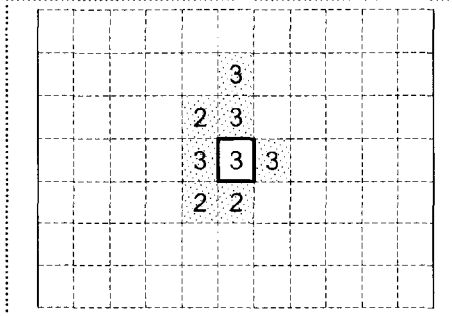

FIG. 4 (b)
No.05: CONVERSION VALUE = BLACK / SYMMETRY INFORMATION SW = 15
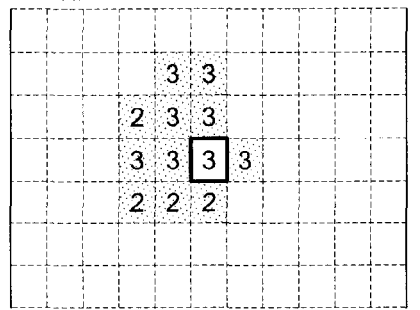

FIG. 4 (c)
No.06: CONVERSION VALUE = BLACK / SYMMETRY INFORMATION SW = 15
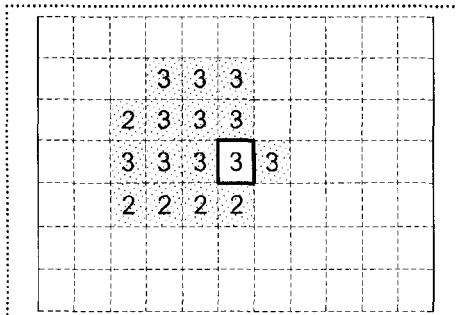

FIG. 4 (d)
No.07: CONVERSION VALUE = BLACK / SYMMETRY INFORMATION SW = 15
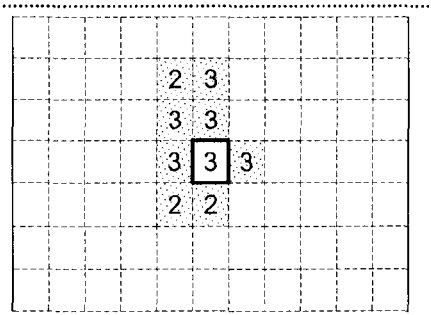

FIG. 4 (e)
No.08: CONVERSION VALUE = BLACK / SYMMETRY INFORMATION SW = 15
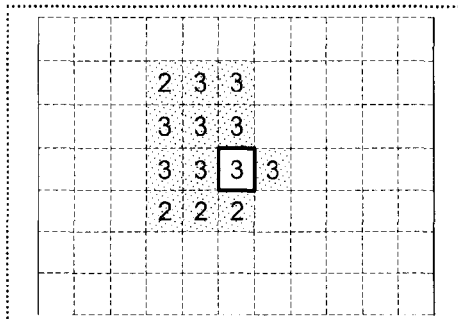

FIG. 4 (f)
No.09: CONVERSION VALUE = BLACK / SYMMETRY INFORMATION SW = 15
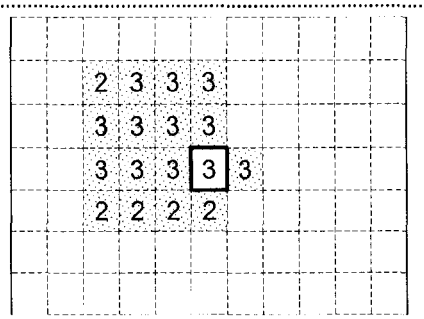

FIG. 4 (g)
No.10: CONVERSION VALUE = WHITE / SYMMETRY INFORMATION SW = 3
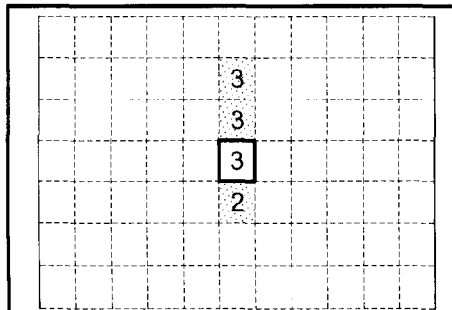

FIG. 4 (h)
No.11: CONVERSION VALUE = WHITE / SYMMETRY INFORMATION SW = 3
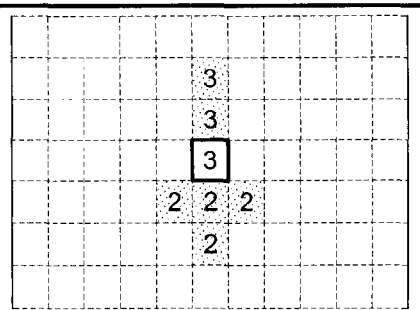

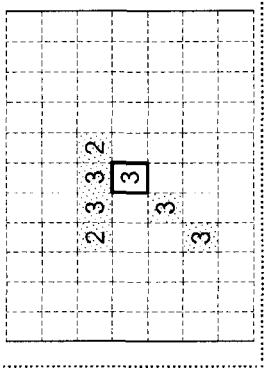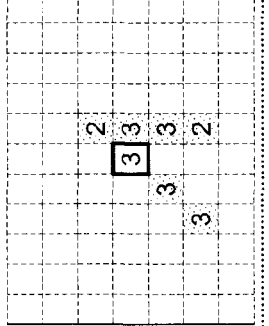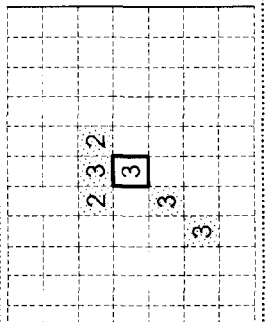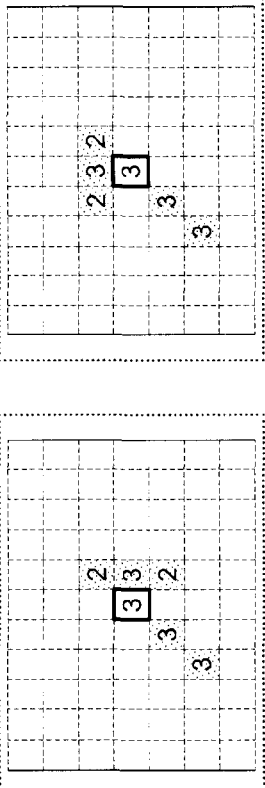
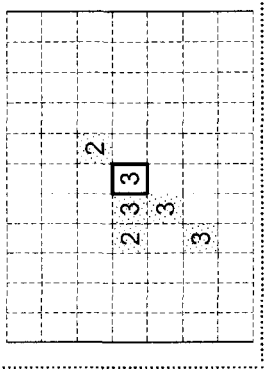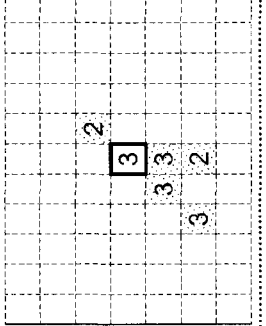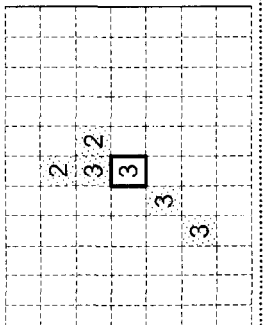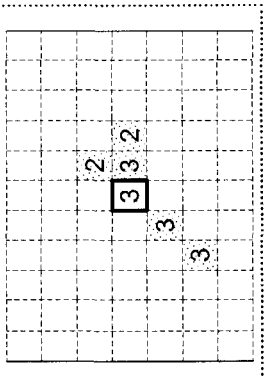
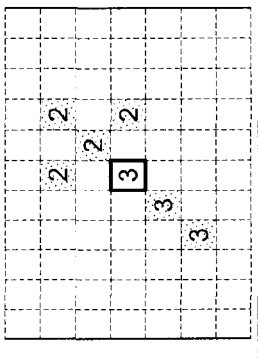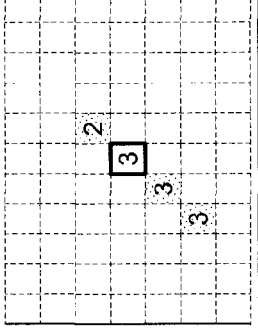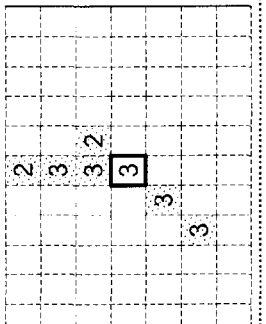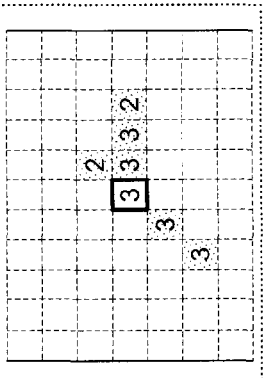

LINE BEFORE LINE
WIDTH ADJUSTMENT

BEFORE LINE
THINNING OPERATION

PIXELS CONVERTED
TO WHITE PIXELS

LINES AFTER LINE
WIDTH ADJUSTMENT

AFTER LINE THINNING
OPERATION

PIXELS CONVERTED
TO WHITE PIXELS

LINE AFTER LINE
WIDTH ADJUSTMENT

AFTER LINE THINNING
OPERATION

FIG. 10 (a)
BEFORE LINE THINNING OPERATION

LINE BEFORE LINE WIDTH ADJUSTMENT

FIG. 10 (b)
AFTER LINE THINNING OPERATION

LINE AFTER LINE WIDTH ADJUSTMENT

FIG. 10 (c)
AFTER LINE THINNING OPERATION

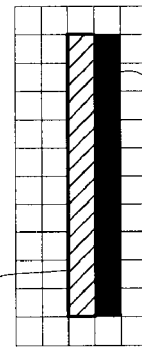

LINE AFTER LINE WIDTH ADJUSTMENT

PIXELS CONVERTED TO WHITE PIXELS

FIG. 10 (d)
BEFORE LINE THINNING OPERATION

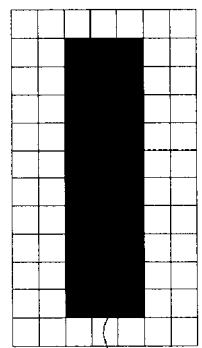

LINE BEFORE LINE WIDTH ADJUSTMENT

FIG. 10 (e)
AFTER LINE THINNING OPERATION

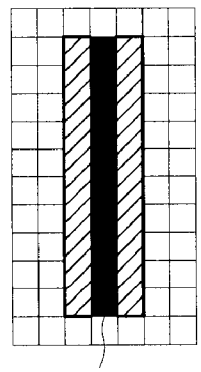

LINE AFTER LINE WIDTH ADJUSTMENT

FIG. 10 (f)
AFTER LINE THINNING OPERATION

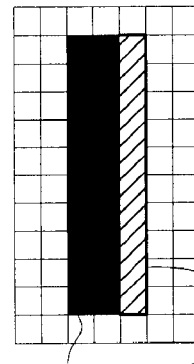

LINE AFTER LINE WIDTH ADJUSTMENT

PIXELS CONVERTED TO WHITE PIXELS

IMAGE PROCESSING WITH AN ADJUSTMENT TO A BINARY IMAGE LINE

This application is based on Japanese Patent Application No. 2006-200363 filed on Jul. 24, 2006 with Japan Patent Office, the entire content of which is hereby incorporated by reference.

BACKGROUND OF THE INVENTION

The present invention relates to an image processing apparatus and an image processing method for conducting a width adjustment processing of a line image represented by predetermined black pixels in a binary image constituted by white pixels and black pixels.

Conventionally, in the market, there has been an image outputting apparatus that forms an image on a transfer material by employing an electro-photographic method including the steps of: forming a latent image on an image bearing member, such as a photoreceptor drum, etc., by scanning a laser beam onto the surface of the image bearing member so as to expose the image bearing member to the image; developing the latent image with toner so as to form a toner image; directly transferring the toner image onto the transfer material, or primary transferring it onto an intermediate transfer member and secondary transferring it onto the transfer material from the intermediate transfer member; and fixing the toner image onto the transfer material by employing a fixing device.

If the toner adhesion appearance in respect to the transfer material were bad in such the image outputting apparatus as mentioned in the above, some portions of the image would be blurred, resulting in deterioration of the image quality as a whole. Further, since a little number of pixels constitute each of the lines included in characters, such the characters are specifically liable to be blurred, and sometimes, it becomes difficult to read such the characters.

Accordingly, in order to improve the toner adhesion appearance, it had been made effort to improve the adhesive property of the toner, by enlarging a dimension of each pixel as large as possible at a predetermined resolution, so as to enlarge the adhesive area of toner.

The larger the dimension of each pixel is made, the better the adhesive property of the toner becomes. However, for instance as its side effect, sometimes, it has occurred that a line was formed bolder than expected, or a white space area was formed smaller than expected. As a result, sometimes, there has occurred such problems that spaces between fine lines were filled with black toner as if it were a solid image, and the characters formed by such the filled line were illegible.

Accordingly, in order to cope with the abovementioned problems, the number of pixels constituting the width of the line has been changed, while enlarging the dimension of the pixel as larger as possible so as to maintain the adhesive property of the toner, so that the width of the line constituted by the black pixels did not become bold and the white space did not become small. For instance, there has been proposed a countermeasure that makes it possible to narrow the width of the line by changing black pixels located adjacent to white pixels and constituting an edge in a line and a character (edge pixels) to white pixels For instance, as an apparatus that conducts the line thinning operation, Patent Document 1 (Tokkaihei 2-268374, Japanese Non-Examined Patent Publication) sets forth an apparatus that conducts the processing for thinning the line width to that equivalent to one pixel width. The processing includes the steps of: comparing the 3×3 pixel value pattern with the mask provided in advance; determining whether or not there is a possibility that the target pixel is converted to a new value by pixel values of the pixels located adjacent to the black pixels; finally determining whether or not the pixel value of the pixel, which is determined that there is the abovementioned possibility, should be further converted by the pixel values of the peripheral pixels by employing another mask; etc.

Since the line thinning operation, conducted by the apparatus set forth in Patent Document 1 (Tokkaihei 2-268374, Japanese Non-Examined Patent Publication), includes the multi-stage determining steps and processing, and accordingly, takes much time, it is desirable that the processing is further simplified and the processing time is further shortened. However, when the line thinning operation was achieved by, for instance, simply changing the edge pixels to the white pixels, sometimes the image quality has been deteriorated, due to the fact that the continuity and the shape of the concerned line could not be maintained, or an isolated pixel would be generated. In other words, it has been uneasy to simplify the processing for the line thinning operation while maintaining the original image quality.

Further, the term of the line thinning operation indicates not only the processing for thinning the line width to that equivalent to one pixel width, but also a method for making it possible to thin the line width to that equal to or greater than two pixel width, and desirably, a method for making it possible to widen the width of a white space (namely, a line constituted by the white pixels).

Although the degree of line thinning, such as changing a line constituted by two pixels to that of a single pixel, leaving a line constituted by two pixels as it is, etc., would vary depending on the user's taste or other factors, it has been difficult to easily cope with such the variations of the tastes or demands.

SUMMARY OF THE INVENTION

To overcome the abovementioned drawbacks in conventional image processing apparatus, it is one of objects of the present invention to provide an image processing apparatus, which makes it possible not only to easily adjust the width of the line image constituted by the predetermined black pixels without deteriorating the image quality of the line image, but also to easily cope with the degree of the line width adjustment desired by the user.

Accordingly, at least one of the objects of the present invention can be attained by the image processing apparatuses and the image processing methods described as follows.
(1) According to an image processing apparatus reflecting an aspect of the present invention, the image processing apparatus that adjusts a width of a line image constituted by predetermined black pixels in a binary image including both white pixels and black pixels, comprises: a storage section to store a first template for detecting a specific pixel that is an edge pixel of the line image and has a continuity with a specific black pixel, and a second template for detecting the edge pixel of the line image; a first determining section to determine whether or not a target pixel is the specific pixel, based on the first template; a second determining section to determine whether or not the target pixel is the edge pixel, based on the second template; and a line width adjusting section to adjust the width of the line image, in such a manner that the line width adjusting section converts the target pixel to a black pixel, when the first determining section determines that the target pixel is the specific pixel, while the line width adjusting section converts the target pixel to a white pixel, when the first determining section determines that the target pixel is not the specific pixel and the second determining section determines that the target pixel is the edge pixel.

(2) According to another aspect of the present invention, in the image processing apparatus recited in item 1, the second determining section determines whether or not the target pixel is the edge pixel, based on the second template, after the first determining section determines that the target pixel is not the specific pixel.

(3) According to still another aspect of the present invention, in the image processing apparatus recited in item 1 or 2, the first template is constituted by a first black pixel located at a first predetermined position, at least one of a first white pixel located adjacent to the first black pixel and the specific black pixel having a continuity with the black pixel, which are disposed within a first predetermined area; and the first determining section determines that the target pixel is the specific pixel, when the target pixel is located at the first predetermined position and first pixels residing within the first predetermined area coincide with the first black pixel, the first white pixel and the specific black pixel, constituting the first template; and the second template is constituted by a second black pixel located at a second predetermined position, and at least one of a second white pixel located adjacent to the second black pixel, which are disposed within a second predetermined area; and the second determining section determines that the target pixel is the edge pixel, when the target pixel is located at the second predetermined position and second pixels residing within the second predetermined area coincide with the second black pixel and the first white pixel, constituting the second template.

(4) According to still another aspect of the present invention, the image processing apparatus recited in item 3 further comprises: a symmetrical template creating section to create a first symmetrical template in which a layout of binary pixels is symmetric to that in the first template and a second symmetrical template in which the layout of binary pixels is symmetric to that in the second template; wherein the first determining section employs both the first template, stored in the storage section, and the first symmetrical template, created by the symmetrical template creating section, to determine whether or not the target pixel is the specific pixel; and wherein the second determining section employs both the second template, stored in the storage section, and the second symmetrical template, created by the symmetrical template creating section, to determine whether or not the target pixel is the edge pixel.

(5) According to still another aspect of the present invention, in the image processing apparatus recited in item 4, the first template and the first symmetrical template are symmetric with respect to either a point or a line; and the second template and the first symmetrical template are symmetric with respect to either a point or a line.

(6) According to still another aspect of the present invention, the image processing apparatus recited in any one of items 1-5, further comprises: an inputting section to input an instruction instructed by an operator; wherein each of the first determining section and the second determining section receives the instruction, indicating use or nonuse of a specific template, from the inputting section, and employs the specific template, use of which is indicated by the instruction.

(7) According to still another aspect of the present invention, in the image processing apparatus recited in any one of items 1-6, the line width adjusting section adjusts the width of the line image with respect to an objective area designated in advance.

(8) According to yet another aspect of the present invention, in the image processing apparatus recited in item 7, the objective area is either a character area or a photographic area.

(9) According to an image processing method reflecting another aspect of the present invention, the image processing method for adjusting a width of a line image constituted by predetermined black pixels in a binary image including both white pixels and black pixels, comprises: storing in advance a first template for detecting a specific pixel that is an edge pixel of the line image and has a continuity with a specific black pixel, and a second template for detecting the edge pixel of the line image; determining whether or not a target pixel is the specific pixel, based on the first template; determining whether or not the target pixel is the edge pixel, based on the second template; converting the target pixel to a black pixel, when determining that the target pixel is the specific pixel in the determining step based on the first template; and converting the target pixel to a white pixel, when determining that the target pixel is not the specific pixel in the determining step based on the first template, and when determining that the target pixel is the edge pixel in the determining step based on the second template.

(10) According to an image processing method reflecting still another aspect of the present invention, the image processing method for adjusting a width of a line image constituted by predetermined black pixels in a binary image including both white pixels and black pixels, comprises: storing in advance a first template for detecting a specific pixel that is an edge pixel of the line image and has a continuity with a specific black pixel, and a second template for detecting the edge pixel of the line image; determining whether or not a target pixel is the specific pixel, based on the first template; converting the target pixel to a black pixel, when determining that the target pixel is the specific pixel in the determining step based on the first template; determining whether or not the target pixel is the edge pixel, based on the second template, when determining that the target pixel is not the specific pixel in the determining step based on the first template; and converting the target pixel to a white pixel, when determining that the target pixel is the edge pixel in the determining step based on the second template.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4(a), FIG. 4(b), FIG. 4(c), FIG. 4(d), FIG. 4(e), FIG. 4(f), FIG. 4(g) and FIG. 4(h) show examples of pixel configurations of first templates and second templates;

FIG. 6(a), FIG. 6(b), FIG. 6(c), FIG. 6(d), FIG. 6(e), FIG. 6(f), FIG. 6(g), FIG. 6(h), FIG. 6(i), FIG. 6(j), FIG. 6(k) and FIG. 6(l) show examples of pixel configurations of first templates and second templates;

FIG. 8(a), FIG. 8(b), FIG. 8(c) and FIG. 8(d) show explanatory views for explaining symmetric shapes of a template;

FIG. 10(a), FIG. 10(b), FIG. 10(c), FIG. 10(d), FIG. 10(e) and FIG. 10(f) show examples of results of width adjusting operations embodied in the present invention;

DETAILED DESCRIPTION OF THE PREFERRED EMBODIMENT

First Embodiment

Figure 1:
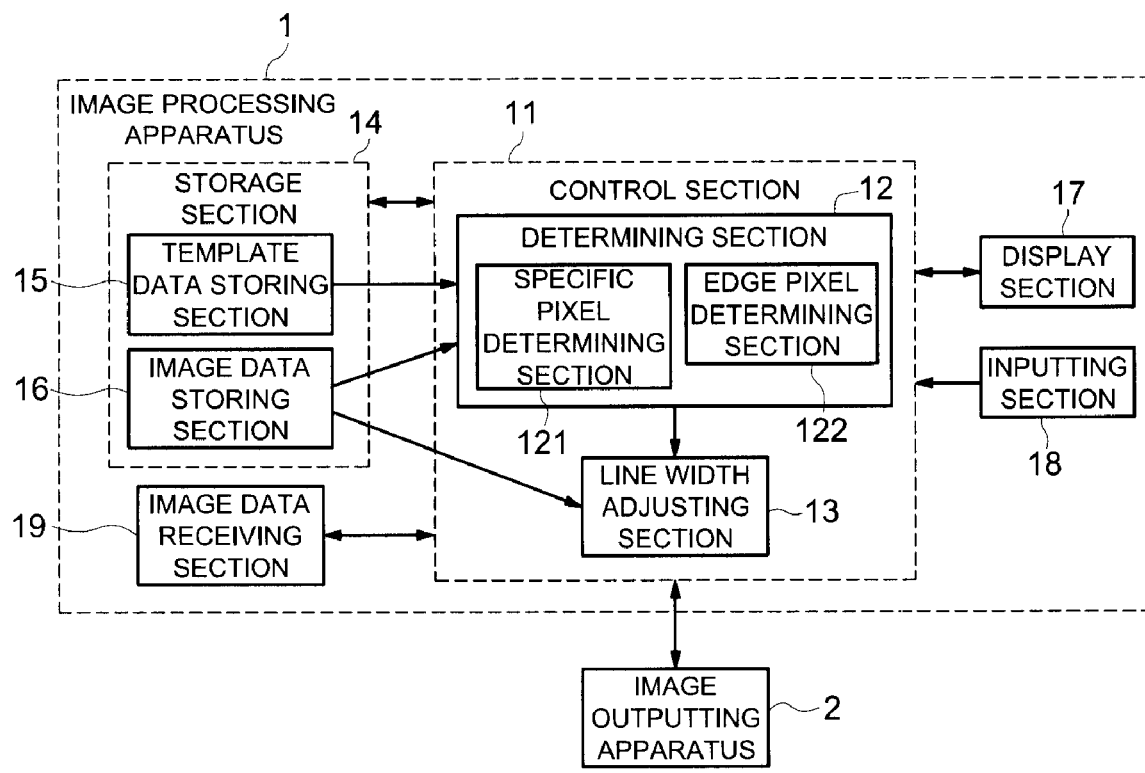
FIG. 1 shows a block diagram indicating a configuration of an image processing apparatus embodied in the present invention.

Referring to the drawings, the image processing apparatus embodied in the present invention as the first embodiment will be detailed in the following.
(Overall Configuration)

Initially, referring to FIG. 1, the configuration of the image processing apparatus embodied in the present invention will be detailed in the following. FIG. 1 shows a block diagram indicating the configuration of the image processing apparatus.

As shown in FIG. 1, an image processing apparatus 1 is coupled to an image outputting apparatus 2 that outputs an image. Further, the image outputting apparatus 2 is coupled to the image processing apparatus 1 through a cable or a network N, such as a LAN, an Internet, etc., so as to make it possible to bilaterally communicate between them.

The image outputting apparatus 2 could be any one of an electro-photographic laser printer, a copier, a multi-functioned apparatus provided with functions of a scanner, a copier and a facsimile, etc.

Further, it is applicable that the configuration of the image outputting apparatus 2 includes functions of the image processing apparatus 1 detailed later as the embodiment of the present invention.

The image processing apparatus 1, serving as a computer, is constituted by a computer proper into which predetermined operational programs and application programs are installed, a keyboard, a mouse, a display monitor, a speaker, etc. Further, the image processing apparatus 1 includes a control section 11 to control various kinds of sections included in the apparatus in the processing mode embodied in the present invention, etc., a storage section 14 to store image data, template data relating to the present invention, various kinds of data, etc., a display section 17 to display image, etc., an inputting section 18 to input various kinds of instructions, selection commands, etc., and an image data receiving section 19 to receive image data sent from an image creating apparatus or an image acquiring apparatus, such as a terminal device, a scanner, etc., (not shown in the drawings).

The display section 17 is constituted by a normal display monitoring device coupled to the computer, such as a LCD (Liquid-Crystal Display) monitor, a CRT (Cathode Ray Tube) monitor, etc. The control section 11 controls the display section 17 to display various kinds of images, inputting screens, etc., on the display monitor.

The inputting section 18, serving as an inputting section of the present invention, includes an inputting device, such as a keyboard, etc., and a pointing device such as a mouse, a tracking ball, etc., so that the operator can conduct various kinds of inputting operations by using such the device.

The image data receiving section 19 is constituted by, for instance, a transmission/reception interface circuit, etc., and serves as a communication section to receive image data sent from the image creating apparatus or the image acquiring apparatus (not shown in the drawings). Further, it is applicable that the image data receiving section 19 is such a reading apparatus that makes it possible to detachably insert a CD-ROM (Compact Disk Read-Only Memory), etc., which stores gradation image data, etc., into the apparatus.

The storage section 14 is constituted by storage devices, such as a hard disc drive, an image memory, etc., and includes a image data storing section 16 and a template data storing section 15.

Figure 2:
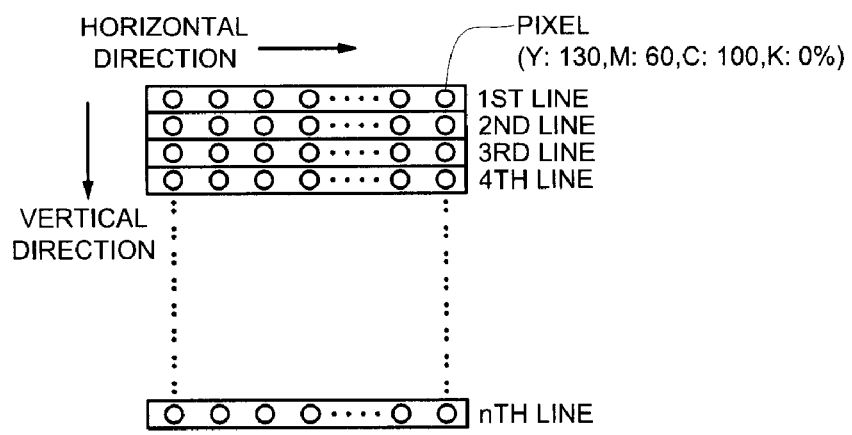
FIG. 2 shows an explanatory view for explaining a structure of image data.

The image data storing section 16 stores image data received by the image data receiving section 19 and/or other image data created by executing a certain application program installed in advance in the image processing apparatus 1, etc., in it. In this connection, the image data to be handled in the present embodiment are called the "bitmap graphics", and, for instance as shown in FIG. 2, are represented by raster data in which one line is constituted by a plurality of pixels disposed in a horizontal direction with predetermined intervals (namely, resolution) and further, a plural lines are aligned in a vertical direction with predetermined intervals. Further, a pixel value of each pixel is represented by a binary value being either value "0" defined as a white pixel or value "1" defined as a black pixel. Still further, it is applicable that a pixel value of each pixel is also represented by a gradation value, which is one of values derived by equally dividing the density variation from the minimum density value of "0" corresponding to a white pixel to the maximum density value of "255" corresponding to a black pixel, into 256 gradation values.

The template data storing section 15 stores first data representing a first template for detecting a specific pixel, which is an edge pixel and serves as a pixel having a continuity with a specific black pixel, and second data representing a second template for detecting an edge pixel, which is a black pixel located adjacent to a white pixel, from the image data, in it. Further, both first and second data of the first template and the second template are represented by the pixel values with respect to the pixels residing within a predetermined range (for instance, "m" vertical pixels×"n" horizontal pixels).

In the first template, a black pixel is disposed at a central position (a reference position), a white pixel is disposed adjacent to the black pixel, and the black pixel disposed at a central position represents an edge pixel. Further, another black pixels (a specific black pixel) is disposed at a specific position corresponding to the black pixel disposed at the central position, and further, depending on a situation, a white pixel is disposed, so as to indicate the fact that this specific black pixel and the black pixel disposed at the central position have a continuity relative to each other. Hereinafter, this pixel being an edge pixel and having continuity with the specific black pixel is defined as a specific pixel.

In the second template, a black pixel is disposed at a central position (a reference position), a white pixel is disposed adjacent to the black pixel, and the black pixel disposed at a central position represents an edge pixel.

Now, referring to FIG. 3 through FIG. 7, pixel configurations of the first template and the second template will be detailed in the following. In this example, the range of 7 pixels×11 pixels is employed as the predetermined range aforementioned. Further, in the drawings, a black pixel is represented by "3", while a white pixels is represented by "2", and a pixel having no indication value represents any one of a black pixel and a white pixel. Still further, the legends "No.", "CONVERSION VALUE=" and "SYMMETRY INFORMATION (SW=)" are indicated in each of the pixel configurations of the first template and the second template. The template data storing section 15 stores the above legends in it, while attaching them to the corresponding template data. Still further, the explanation of those legends will be detailed later. The scope of the present invention is not limited to the above, it is applicable that the above legends are stored in a database while correlating them to each of the template data.

FIG. 3(a), FIG. 3(b), FIG. 3(c) and FIG. 3(d), show configurations of the first template and the second template for detecting black pixels constituting the edge pixel, such as a line image formed within a two pixel width, etc. Further, the above line image formed within the two pixel width is one of various line images configured by the predetermined black pixels.

Figure 3:
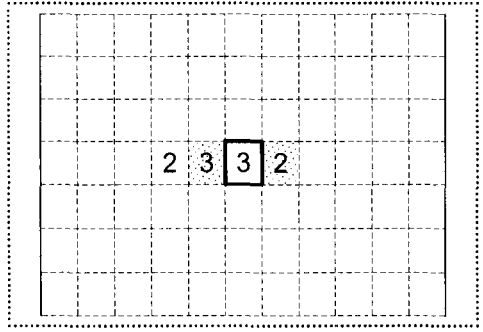
FIG. 3(a), FIG. 3(b), FIG. 3(c) and FIG. 3(d) show examples of pixel configurations of first templates and second templates.
Figure 3:
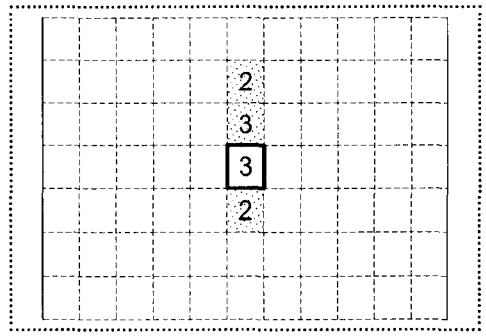
Figure 3:
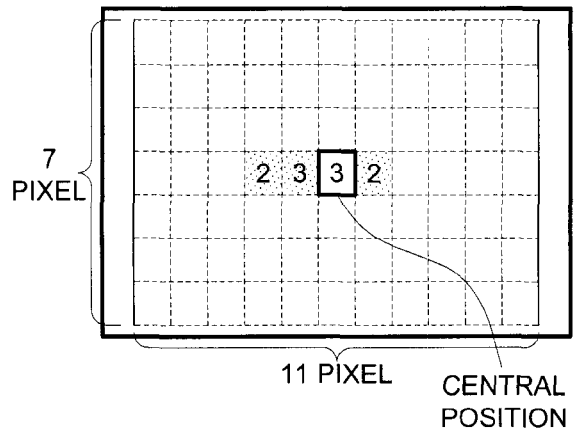
Figure 3:
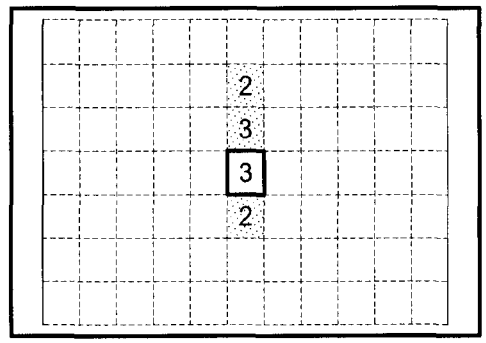
Figure 5A:
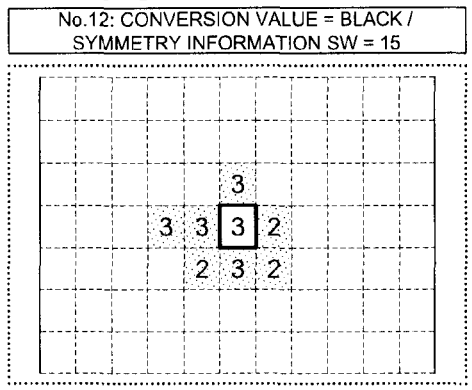
FIG. 5(a), FIG. 5(b), FIG. 5(c), FIG. 5(d), FIG. 5(e), FIG. 5(f), FIG. 5(g) and FIG. 5(h) show examples of pixel configurations of first templates and second templates.
Figure 5B:
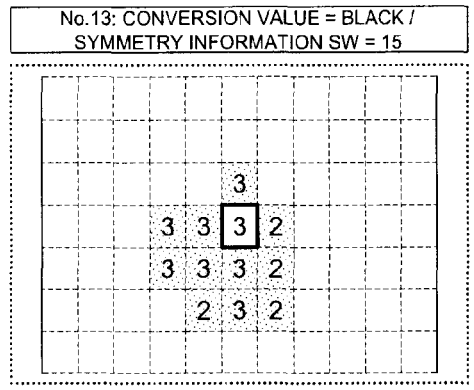
Figure 5C:
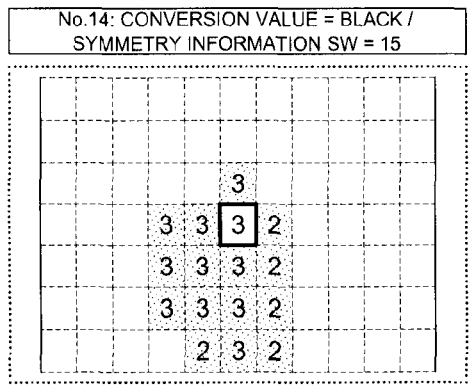
Figure 5D:
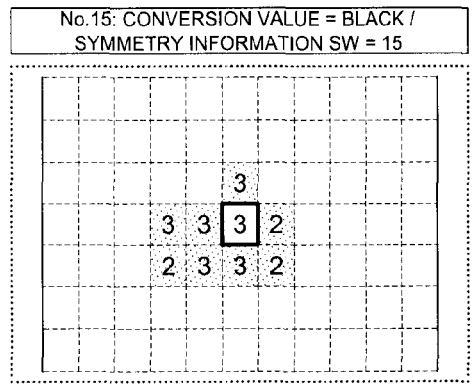
Figure 5E:
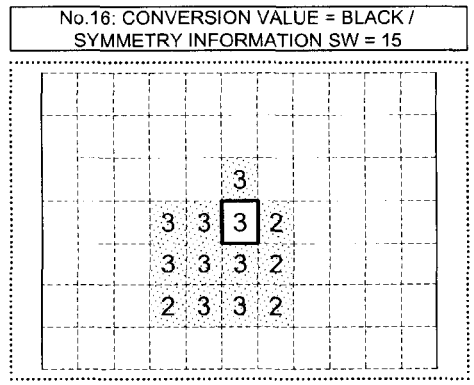
Figure 5F:
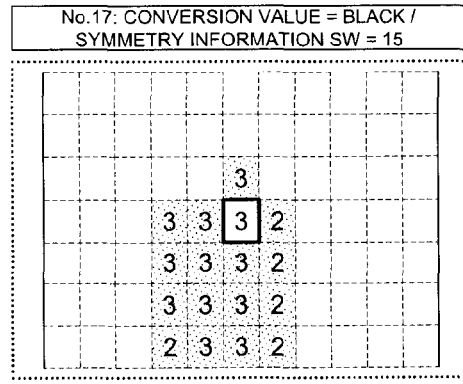
Figure 5G:
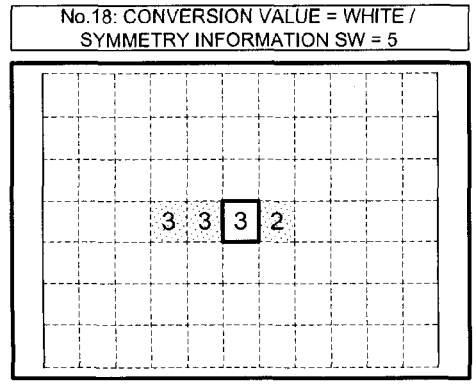
Figure 5H:
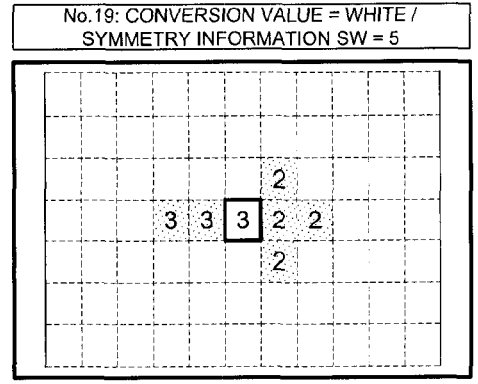

FIG. 3(a) and FIG. 3(b) show configurations of the first template. FIG. 3(a) shows black pixels constituting the edge pixel in a horizontal direction in the image data (as shown in FIG. 3, the edge pixel is indicated by surrounding it with the bold frame, and the edge pixels shown in the following are also indicated by surrounding it with the bold frame, as well), while FIG. 3(b) show black pixels constituting the edge pixel in a vertical direction. Further, in each of the configurations shown in FIG. 3(a) and FIG. 3(b), white pixels are disposed adjacent to the black pixel located at the central position, so that the black pixel located at the central position is indicated as the edge pixel, and further, one black pixel and one white pixel are disposed opposite to the white pixel in a line, while putting the black pixel located at the central position between them, so as to indicate the line image having the two pixel width, and to indicate that the black pixel located at the central position has a continuity with the black pixel disposed opposite to the white pixel. Accordingly, the black pixel disposed opposite to the white pixel represents the specific black pixel embodied in the present invention.

Further, FIG. 3(c) and FIG. 3(d) show configurations of the second template. FIG. 3(c) shows black pixels constituting the edge pixel in a horizontal direction in the image data, while FIG. 3(d) show black pixels constituting the edge pixel in a vertical direction. Further, in each of the configurations shown in FIG. 3(c) and FIG. 3(d), white pixels are disposed adjacent to the black pixel located at the central position, so that the black pixel located at the central position is indicated as the edge pixel, and further, one black pixel and one white pixel are disposed opposite to the white pixel in a line, while putting the black pixel located at the central position between them, so as to indicate the line image having the two pixel width. Further, the one black pixel disposed opposite side does not indicate any continuity, but the black pixel located at the central position is merely indicated as the edge pixel. As described in the foregoing, with respect to the line image of the two pixel width, the pixel configurations of the first template and the second template are the same as each other.

FIGS. 4(a)-4(h), show configurations of the first template and the second template for detecting black pixels constituting the edge pixel in a vertical direction, in the image data of a line image, etc., having a width equal to or greater than that of three pixels. Further, the above line image, having a width equal to or greater than that of three pixels, is one of various line images configured by the predetermined black pixels.

Further, FIGS. 4(a)-4(f) show configurations of the first template, respectively. Further, in each of the configurations shown in FIGS. 4(a)-4(f), white pixels are disposed below the black pixel located at the central position, so that the black pixel located at the central position is indicated as the edge pixel, and further, plural black pixels are disposed opposite to the white pixels in a line, while putting the black pixel located at the central position between them, so as to represent the line image having the three pixel width. Further, white pixels or black pixels are disposed in the peripheral space around the black pixel serving as the edge pixel. In FIG. 4(a), a first black pixel is disposed at the left side position of the edge pixel, so as to indicate that the black pixel located at the central position has a continuity with the first black pixel disposed at the left side position. Further, in FIG. 4(b), it is indicated that the black pixel located at the central position has a continuity with the first black pixel disposed at the left side position of the edge pixel, and further, has a continuity with a second black pixel disposed at the further left side position next to the first black pixel. Still further, in FIG. 4(c), it is indicated that the black pixel located at the central position has a continuity with the first black pixel disposed at the left side position of the edge pixel, and further, has a continuity with the second black pixel disposed at the further left side position next to the first black pixel, and still further, has a continuity with a third black pixel disposed at the further left side position next to the second black pixel. Still further, in FIG. 4(d), first black pixels are disposed adjacent to a left side position and a left upper side position of the edge pixel, so as to indicate that the black pixel located at the central position has continuity with the first black pixels respectively located at the left side position and the left upper side position. Still further, in FIG. 4(e), it is indicated that the black pixel located at the central position has continuity with the first black pixels respectively located at the left side position and the left upper side position, and further, has continuity with second black pixels respectively disposed at the further left side positions next to the first black pixels. Yet further, in FIG. 4(f), it is indicated that the black pixel located at the central position has continuity with the first black pixels respectively located at the left side position and the left upper side position, and further, has continuity with the second black pixels respectively disposed at the further left side positions next to the first black pixels, and has continuity with third black pixels respectively disposed at the further left side positions next to the second black pixels. The black pixel, having such the continuity as mentioned in the above, represents the specific black pixel embodied in the present invention.

Further, FIG. 4(g) and FIG. 4(h) show configurations of the second template, respectively. In each of the configurations shown in FIG. 4(g) and FIG. 4(h), white pixels are disposed adjacent to the black pixel located at the central position, so that the black pixel located at the central position is indicated as the edge pixel. Further, plural black pixels are disposed opposite to the white pixels in a line, while putting the black pixel located at the central position between them, so as to represent the line image having the two pixel width. Still further, the number of white pixels disposed adjacent to the black pixel located at the central position in the second template shown in FIG. 4(g) is different from that in the second template shown in FIG. 4(h). Accordingly, it is possible to detect the black pixel disposed adjacent to the white space line of one pixel by employing the second template shown in FIG. 4(g), while it is impossible to detect the black pixel disposed adjacent to the white space line of one pixel by employing the second template shown in FIG. 4(h). Therefore, the second template shown in FIG. 4(g) should be employed when adjusting the width of the white space line of one pixel.

FIGS. 5(a)-5(h), show configurations of the first template and the second template for detecting black pixels constituting the edge in a horizontal direction, in the image data of a line image, etc., having a width equal to or greater than that of three pixels. The configurations shown in FIGS. 5(a)-5(h) can be obtained by rotating those shown in FIGS. 4(a)-4(h) anti-clockwise by 90 degrees, respectively.

FIGS. 6(a)-6(l), show configurations of the first template and the second template for detecting black pixels constituting the edge pixel in a diagonal direction, in the image data of a line image, etc., having a width equal to or greater than that of three pixels in a diagonal direction. Further, the above line image, having a width equal to or greater than that of three pixels in a diagonal direction, is one of various line images configured by the predetermined black pixels.

Further, FIGS. 6(a)-6(j) show configurations of the first template, respectively. In each of the configurations shown in FIGS. 6(a)-6(j), white pixels are disposed adjacent to the black pixel, located at the central position, in a right diagonal direction, so that the black pixel located at the central position is indicated as the edge pixel constituting the edge in a diagonal direction. Further, a plurality of black pixels are disposed opposite to the white pixel in a line, while putting the black pixel located at the central position between them, so as to indicate the line image having a width equal to or greater than that of three pixels in a diagonal direction. Still further, white pixels or black pixels are disposed in the peripheral space around the black pixel serving as the edge pixel.

In FIG. 6(a), a black pixel is disposed adjacent to the right side position of the edge pixel, so as to indicate that the black pixel located at the central position has a continuity with the first black pixel disposed adjacent to the right side position. Further, in FIG. 6(b), a black pixel is disposed adjacent to the upper side position of the edge pixel, so as to indicate that the black pixel located at the central position has a continuity with the first black pixel disposed adjacent to the upper side position. Still further, in FIG. 6(c), black pixels are disposed adjacent to a right side position and a right lower side position of the edge pixel, respectively, so as to indicate that the black pixel located at the central position has a continuity with those black pixels. Still further, in FIG. 6(d), black pixels are disposed adjacent to an upper side position and a left upper side position of the edge pixel, respectively, so as to indicate that the black pixel located at the central position has a continuity with those first black pixels. Still further, a layout of white pixels to be disposed in the peripheral space around the black pixel disposed adjacent to the edge pixel shown in FIG. 6(e) is different from that shown in FIG. 6(f). Still further, in FIG. 6(g), a black pixel is disposed adjacent to a lower side position of the edge pixel, so as to indicate that the black pixel located at the central position has a continuity with the black pixel disposed adjacent to the lower side position. Still further, in FIG. 6(h), a black pixel is disposed adjacent to a left side position of the edge pixel, so as to indicate that the black pixel located at the central position has a continuity with the black pixel disposed adjacent to the left side position. Still further, in FIG. 6(i), a first black pixel is disposed adjacent to a right side position of the edge pixel and a second black pixel is disposed at the further right side position next to the first black pixel, so as to indicate that the black pixel located at the central position has continuity with both the first black pixel and the second black pixel. Yet further, in FIG. 6(j), a first black pixel is disposed adjacent to an upper side position of the edge pixel and a second black pixel is disposed at the further upper side position next to the first black pixel, so as to indicate that the black pixel located at the central position has continuity with both the first black pixel and the second black pixel. The black pixel, having such the continuity as mentioned in the above, represents the specific black pixel embodied in the present invention.

Further, FIG. 6(k) and FIG. 6(l) show configurations of the second template, respectively. In each of the configurations shown in FIG. 6(k) and FIG. 6(l), white pixels are disposed adjacent to the black pixel, located at the central position, in a right diagonal direction, so that the black pixel located at the central position is indicated as the edge pixel constituting the edge in the diagonal direction. Still further, the number of white pixels disposed adjacent to the black pixel located at the central position in the second template shown in FIG. 6(k) is different from that in the second template shown in FIG. 6(l). Accordingly, it is possible to detect the black pixel disposed adjacent to the white space line of one pixel by employing the second template shown in FIG. 6(k), while it is impossible to detect the black pixel disposed adjacent to the white space line of one pixel by employing the second template shown in FIG. 6(l). Therefore, the second template shown in FIG. 6(k) should be employed when adjusting the width of the white space line of one pixel.

Figures 7, 8:
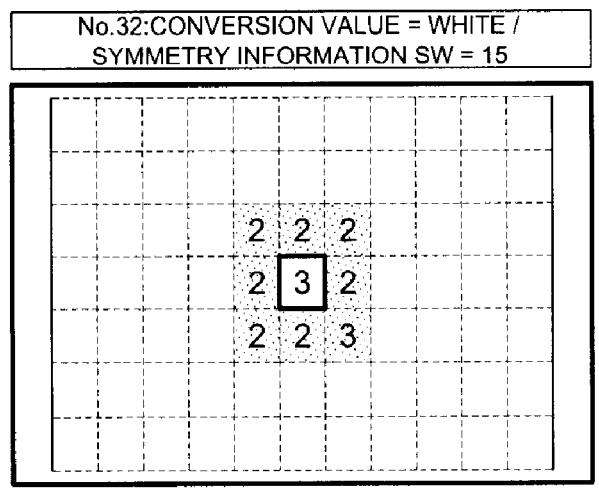
FIG. 7 shows an example of a pixel configuration of a second template.

FIG. 7 shows the second template for detecting a black pixel, which is isolated from peripheral black pixels, as the edge. As shown in FIG. 7, white pixels are disposed at peripheral positions surrounding the black pixel located at the central position, so as to indicate that the black pixel located at the central position is the isolated pixel.

The legend of "No." attached to each of the templates indicates a priority order, serving as an order to be employed by a determining section 12, detailed later, at the time when the determining section 12 conducts an edge detecting operation. Further, with respect to the templates shown in each group of FIGS. 3(a)-3(d), FIGS. 4(a)-4(h), FIGS. 5(a)-5(h) and FIGS. 6(a)-6(l), the priority orders of the first templates are established at orders higher than those of the second templates.

The legend of "CONVERSION VALUE=" attached to each of the templates indicates a pixel value to be converted by a line width adjusting section 13 (serving as an adjusting section), detailed later. The legend of "CONVERSION VALUE=BLACK" is attached to each of the first templates, while the legend of "CONVERSION VALUE=WHITE" is attached to each of the second templates. In this connection, although the CONVERSION VALUE is a binary value being either white or black in the present embodiment, when handling a multiple value image, it is also applicable that CONVERSION VALUE is a gradation value representing a halftone density. In this case, it becomes possible to make the edge vary smoothly.

The legend of "SYMMETRY INFORMATION (SW=)" attached to each of the templates indicates usage information representing whether or not the concerned template is employed by the determining section 12 detailed later, and symmetry type usage information representing whether or not a symmetry type template of the concerned template is employed. Concretely speaking with respect to the symmetry type template, although only one directional edge, for instance, the lower side edge for the vertical direction, is indicated in the concerned template without indicating any template indicating the upper side edge, a symmetry type template indicating the upper side edge can be created on the basis of the above, for instance, from a template indicating the lower side edge, and then, it is indicated whether or not such the newly created template is employed. According to the above, it becomes possible to store only a minimum number of templates, resulting in a reduction of storage capacity to be provided in storage section 14.

For instance, referring to FIGS. 8(a)-8(d), the symmetry shape will be detailed in the following. FIG. 8(a) shows an original shape, FIG. 8(b) shows a shape created by reversing the original shape upside down (line symmetry), FIG. 8(c) shows a shape created by reversing the original shape right to left (line symmetry), and FIG. 8(d) shows a shape created by reversing the original shape upside down and further reversing it right to left, namely, by rotating the original shape around a center of a predetermined point by 180 degrees (point symmetry). In other words, by reversing the first template and the second template in such a manner as indicated in FIGS. 8(a)-8(d), for instance, a new template, created by reversing a template, indicating a lower side edge, upside down, can be employed as the template indicating an upper side edge.

The values of 1, 15 and 3 indicted in "SYMMETRY INFORMATION (SW=)" attached to the templates shown in FIGS. 3(a)-3(d) through FIG. 7, are decimal numbers converted from the 4-bits binary data represented by 0 and 1. For instance, $1^{st}$-bit is allotted to indicate whether or not a template is employed, namely, "1" indicates "employed", while "0" indicates "unemployed". Further, for instance, $2^{nd}$-bit is allotted to indicate whether or not a template created by reversing upside down is employed, namely, "1" indicates "employed", while "0" indicates "unemployed". Still further, for instance, $3^{rd}$-bit is allotted to indicate whether or not a template created by reversing right to left is employed, namely, "1" indicates "employed", while "0" indicates "unemployed". Yet further, for instance, $4^{th}$-bit is allotted to indicate whether or not a template created by rotating to 180 degrees is employed, namely, "1" indicates "employed", while "0" indicates "unemployed".

For instance, when the value of the 4-bits binary data is represented by (1, 1, 1, 1), the value indicates that a template is employed, a template created by reversing upside down is employed, a template created by reversing right to left is employed, and a template created by rotating to 180 degrees is employed. Further, the value of 1111 represented by the 4-bits binary data can be converted to the value of 15 as the decimal number. Further, for instance, when the value of the 4-bits binary data is represented by (0, 0, 1, 1), the value indicates that a template is employed, a template created by reversing upside down is employed, a template created by reversing right to left is unemployed, and a template created by rotating to 180 degrees is unemployed. Further, the value of 0011 represented by the 4-bits binary data can be converted to the value of 3 as a decimal number. Still further, for instance, when the value of the 4-bits binary data is represented by (0, 0, 0, 1), the value indicates that a template is employed, a template created by reversing upside down is unemployed, a template created by reversing right to left is unemployed, and a template created by rotating to 180 degrees is unemployed. Further, the value of 0001 represented by the 4-bits binary data can be converted to the value of 1 as a decimal number. According to the above, only by preparing a minimum number of template data sets, it becomes possible to easily conduct the usage and addition of the template data corresponding to the user's taste.

Further, it is applicable that, with respect to the values described in the aforementioned legends "No.", "CONVERSION VALUE=" and "SYMMETRY INFORMATION (SW=)", those written in advance in the programs are attached to each of the template data sets, or the operator operates the inputting section 18 and the control section 11 makes the display section 17 display the inputting screen, etc., for inputting the information in regard to "No.", "CONVERSION VALUE=" and "SYMMETRY INFORMATION (SW=)", and then, the operator input the information by employing the inputting section 18 so that the control section 11 receives the inputted information and instructs the storage section 14 to rewrite the stored values of "No.", "CONVERSION VALUE=" and "SYMMETRY INFORMATION (SW=)".

The control section 11 is constituted by a CPU (Central Processing Unit, not shown in the drawings), various kinds of programs and a storage device (not shown in the drawings), such as a system memory in which various kinds of data necessary for executing the programs are stored and in which a working area is created when executing the programs, etc., so as to control the various section included in the apparatus. By executing the computer programs concerned, or according to the instructions inputted from the inputting section 18, the control section 11 serves as the determining section 12 and the line width adjusting section 13. Further, the control section 11 also serves as a display controlling section for controlling the display section 17. Still further, the control section 11 also serves as a managing section for managing the image data to be stored in the storage section 14 and various kinds of information.

The determining section 12 includes a specific pixel determining section 121 (first determining section) to determine whether or not a target pixel in the image data is a specific pixel by employing the first template stored in the template data storing section 15 and an edge pixel determining section 122 (second determining section) to determine whether or not a target pixel in the image data is an edge pixel by employing the second template stored in the template data storing section 5.

Now, the line width adjusting operation for a line image, to be conducted in both the determining section 12 and the line width adjusting section 13, will be detailed in the following.

Initially, the specific pixel determining section 121 determines a certain pixel included in the image data as a target pixel, and then, extracts an area, at the center of which the target pixel is located, and which corresponds to the template, namely, the pixel values of 7 pixels×11 pixels area in this example. Successively, the specific pixel determining section 121 compares each of the extracted pixel values with the first template, and, when black pixels and white pixels indicated in the first template coincide with the extracted pixel values, determines the target pixel as the specific pixel, and then, transmits the information that the target pixel is the specific pixel to the line width adjusting section 13.

On the other hand, when black pixels and white pixels indicated in the first template do not coincide with the extracted pixel values, the specific pixel determining section 121 determines that the target pixel is not the specific pixel. Successively, in the same way as mentioned in the above, the edge pixel determining section 122 compares each of the extracted pixel values with the second template, and, when black pixels and white pixels indicated in the second template coincide with the extracted pixel values, determines the target pixel as the edge pixel, and then, transmits the information that the target pixel is the edge pixel to the line width adjusting section 13. When black pixels and white pixels indicated in the second template do not coincide with the extracted pixel values, the edge pixel determining section 122 determines that the target pixel is not the edge pixel, and then, transmits the information that the target pixel is not the edge pixel to the line width adjusting section 13.

Based on the determining results made by the determining section 12, the line width adjusting section 13 changes the pixel value of the target pixel according to the "CONVERSION VALUE=" in each of the templates. In this example, "CONVERSION VALUE=BLACK" is attached to each of the first templates, while "CONVERSION VALUE=WHITE" is attached to each of the second templates. Accordingly, the pixel value of the target pixel determined as the specific pixel is converted to "black", while the pixel value of the target pixel determined as the edge pixel is converted to "white". Further, the pixel value of the target pixel, which is determined as neither the specific pixel nor the edge pixel, is maintained as it is without being converted. The line width adjusting operation is conducted in such the manner as mentioned in the above in the present embodiment. Accordingly, when the edge pixel has continuity with the specific black pixel, namely, since the specific pixel is converted to "black", the continuity with the specific black pixel is not spoiled even for the edge pixel. For instance, when the pixel values of the target pixel coincide with the first template shown in FIG. 4(*a*), since the target pixel can be determined as such a pixel that has continuity with the black pixel located at left side in the present embodiment, the target pixel is maintained as the black pixel as it is, so as to make it possible to keep the continuity with the black pixel located at left side. However, in the case that only the second template shown in FIG. 4(*g*) is employed without employing the first template of the present embodiment, since it is impossible to determine the continuity with the black pixel located at left side, the target pixel is determined as the edge pixel. Accordingly, since the target pixel is converted to the white pixel, only the black pixel located at left side of the target pixel shown in FIG. 4(*a*) is remained, resulting in an inability of keeping the continuity.

Therefore, by employing the first template embodied in the present invention, it becomes possible to keep the continuity, and accordingly, it also becomes possible to suppress the deterioration of the image quality of the reproduced image.

Further, the specific pixel determining section 121 and the edge pixel determining section 122 conducts the abovementioned determining operation by employing the each of the templates in order of the numbers indicated by "No.", and still further, employs the template, the usage of which is established in "SYMMETRY INFORMATION (SW=)". When it is established that a symmetry type template is to be used, the symmetry type template designated by "SYMMETRY INFORMATION (SW=)" is created in the determining section 12, and then, the specific pixel determining section 121 or the edge pixel determining section 122 employs the created template to conduct the abovementioned determining operation. Accordingly, the determining section 12 also serves as the template creating section having a function for creating the template embodied in the present invention.

Further, since it is possible to establish not only use or nonuse of the template itself, but also use or nonuse of the symmetry type template, by employing the "SYMMETRY INFORMATION (SW=)", it becomes possible to cope with various kinds of width adjusting operations.

Figure 9A:
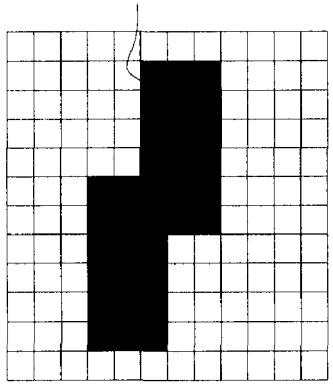
FIG. 9(a), FIG. 9(b) and FIG. 9(c) show examples of results of width adjusting operations embodied in the present invention.
Figure 9B:
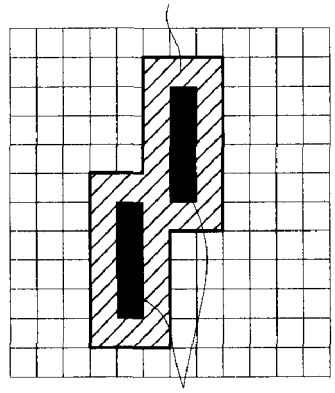
Figure 9C:
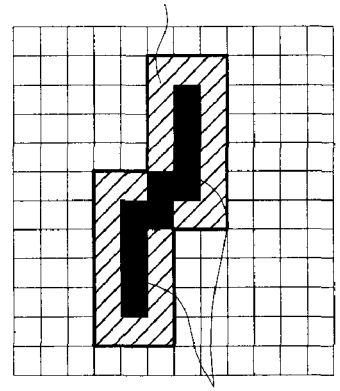

For instance, FIG. 9(*a*), FIG. 9(*b*) and FIG. 9(*c*) show examples of the results of the width adjusting operations. FIG. 9(*a*) shows the original line before applying the width adjusting operations, FIG. 9(*b*) shows the pixels converted to the white pixels (indicated by the hatched area, same as follows) and the black lines processed by the width adjusting operation when only the second template is employed for the abovementioned comparison, and FIG. 9(*c*) shows the pixels converted to the white pixels and the black line processed by the width adjusting operation when both the first template and the second template are employed. The crank shaped line having the three-pixels width, shown in FIG. 9(*a*), is divided into two lines as shown in FIG. 9(*b*), when the width adjusting operation is applied to it by employing the second template only. While, when the width adjusting operation is applied to the original crank shaped line by employing both the first template and the second template, since the pixels residing between the separated two lines can be converted to black pixels, it becomes possible to obtain the processed crank shaped line shown in FIG. 9(*c*). As mentioned in the above, by employing the first template, it becomes possible to keep continuity of the line or the edge. However, when it is not desired to keep continuity of the line or the edge, it is also possible to employ only the second template without employing the first template to conduct the width adjusting operation, by setting the value of "SYMMETRY INFORMATION (SW=)" at a value conforming such the mode.

Further, it also becomes possible to change a degree of the width adjusting operation, corresponding to the value of "SYMMETRY INFORMATION (SW=)". FIGS. 10(*a*)-10(*f*) show examples of the results of such the width adjusting operations. FIG. 10(*a*) shows the original line having a two pixels width, FIG. 10(*b*) shows the pixels converted to the white pixels and the black line processed by the width adjusting operation when only the second template shown in FIG. 3(*c*) or FIG. 3(*d*) is employed without employing the first template, and FIG. 10(*c*) shows the pixels converted to the white pixels and the black line processed by the width adjusting operation when the first template is employed. Further, FIG. 10(*d*) shows the original line having a three pixels width, FIG. 10(*e*) shows the pixels converted to the white pixels and the black line processed by the width adjusting operation when the symmetry type templates of both the first template and the second template shown in FIGS. 5(*a*)-5(*h*) are employed, and FIG. 10(*f*) shows the pixels converted to the white pixels and the black line processed by the width adjusting operation when both the first template and the second template shown in FIGS. 5(*a*)-5(*h*) are employed without employing the symmetry type template. As shown in FIGS. 10(*a*)-10(*f*), when the value of "SYMMETRY INFORMATION (SW=)" indicates use of the first template and the second template for detecting the edge pixel of the line image, etc., having a two pixels width as shown in FIGS. 3(*a*)-3(*d*), the line image having a two pixels width is converted to the line image having a single pixel width (shown in FIG. 10(*c*)), while when indicating nonuse of them, the line image having a two pixels width can be maintained as it is (shown in FIG. 10(*b*)). Further, by employing the symmetry type template, for instance, the pixel values of the pixels disposed along the both sides of the line having a three pixels width are converted to the white pixels, so as to convert it to the line having a single pixel width (shown in FIG. 10(*e*)), while by employing no symmetry type template, for instance, the pixel values of the pixels disposed along the one side of the line having a three pixels width can be converted to the white pixels, so as to convert it to the line having a two pixels width (shown in FIG. 10(*f*)).

Further, for instance, by making it possible to change the value of "SYMMETRY INFORMATION (SW=)" to a new value inputted from the inputting screen, it becomes possible to easily cope with the operator's taste. Further, it is applicable that the data representing the symmetry type templates to be employed are prepared in advance and are stored in the template data storing section 15 in advance.

Further, with respect to the image data representing such an image that includes different kinds of image areas, for instance, such as a character image area, a photographic image area, etc., sometimes, it is desired that such the different kinds of image areas are discriminated between an image area to which the abovementioned line width adjusting operation is to be applied and another image area to which the abovementioned line width adjusting operation is not to be applied. For this case, it is applicable that an objective area is determined in advance so as to apply the width adjusting operation of the line image to the objective area determined in advance. For instance, the control section 11 is instructed in advance that at least one of a character image area and a photographic image area is designated as an objective area to which the width adjusting operation of the line image is applied. Then, the control section 11 extracts the objective area from the image data; namely, the control section 11 serves as an extracting section. When the target pixel resides within the objective area extracted, the line width adjusting section 13 changes the pixel value, while, when the target pixel resides outside the objective area extracted, the line width adjusting section 13 does not change the pixel value. In this connection, it is possible to extract either the character image area or the photographic image area by conducting such a process including the steps of: extracting features of plural pixels; conducting the inference processing employing a fuzzy logic, based on the data of the extracted features, to determine a kind of image area; and extracting the image area concerned (for instance, set forth in Tokkaihei 5-14702, Japanese Non-Examined Patent Publication).

(Operating Mode)

Figure 11:
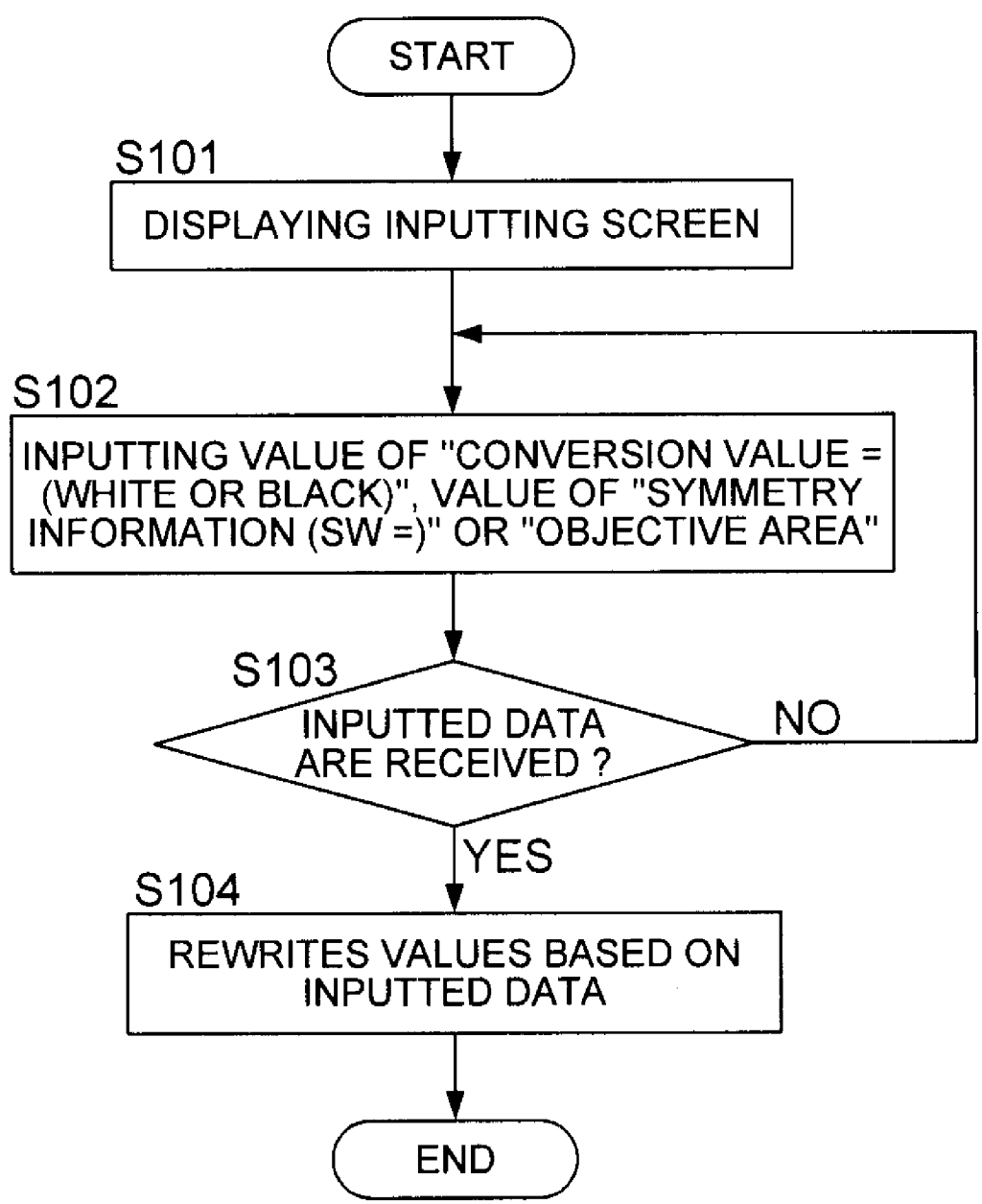
FIG. 11 shows a flowchart indicating an operating mode in an image processing apparatus embodied in the present invention as a first embodiment.
Figure 12:
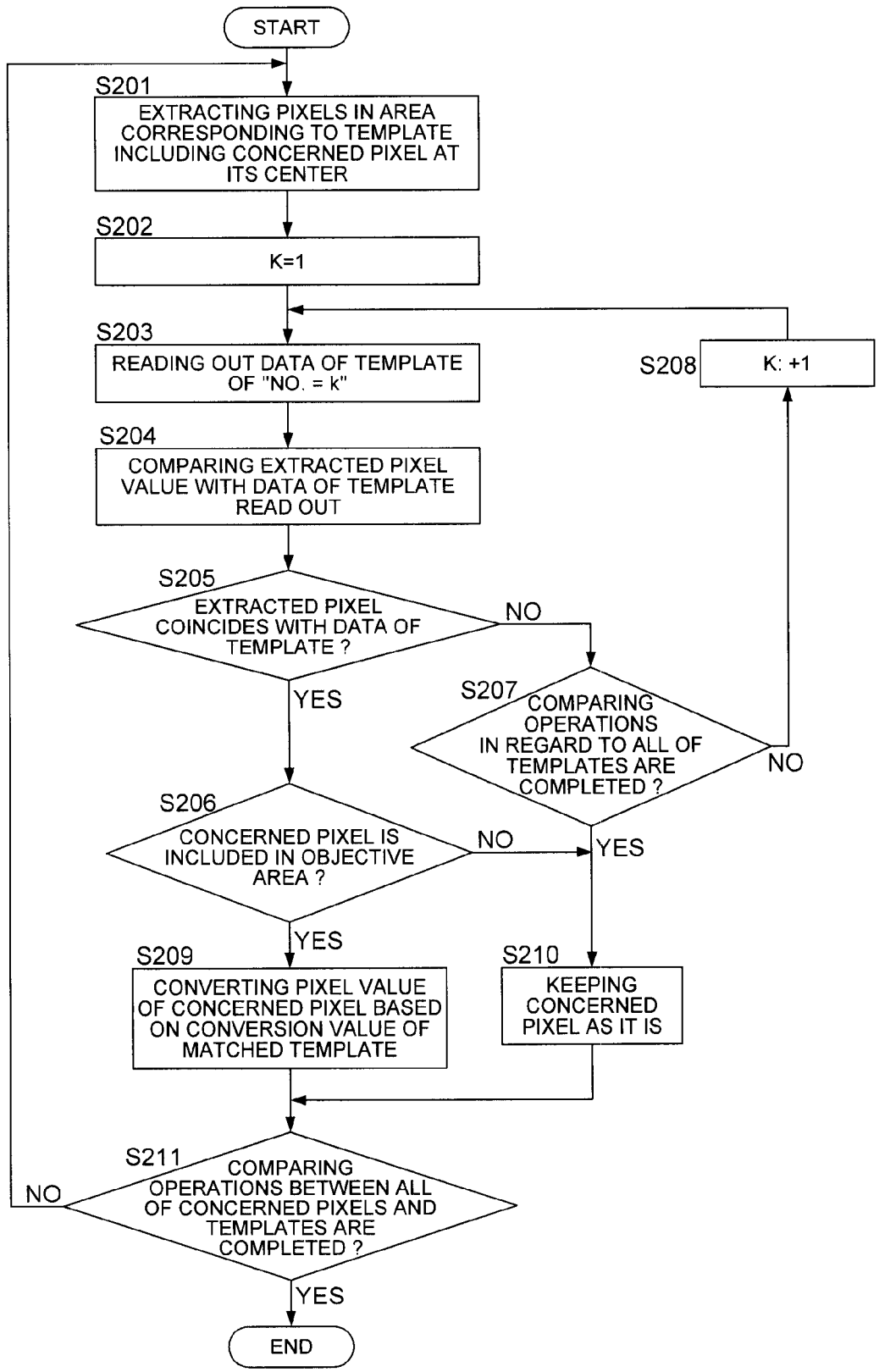
FIG. 12 shows a flowchart indicating another operating mode in an image processing apparatus embodied in the present invention as a first embodiment.

Next, referring to FIG. 11 and FIG. 12, an example of the operating mode in the image processing apparatus having the configuration aforementioned will be detailed in the following. FIG. 11 and FIG. 12 show flowcharts indicating the operating modes in the image processing apparatus embodied in the present invention.

FIG. 11 shows a flowchart of operations for inputting the value of "CONVERSION VALUE=(WHITE OR BLACK)", the value of "SYMMETRY INFORMATION (SW=)" or "OBJECTIVE AREA" by employing the inputting screen. Initially, the operator operates the inputting section 18, and then, the control section 11 receives the inputted data so as to make the display section 17 display the inputting screen (Step S101, shown in FIG. 11). Successively, the operator inputs the value of "CONVERSION VALUE=(WHITE OR BLACK)", the value of "SYMMETRY INFORMATION (SW=)" or "OBJECTIVE AREA" from the inputting screen displayed, as needed (Step S102). The control section 11 receives the data inputted in the above (Step S103, Yes), and rewrites them based on the inputted data (Step S104). By inputting the value of "CONVERSION VALUE=(WHITE OR BLACK)", the value of "SYMMETRY INFORMATION (SW=)" or "OBJECTIVE AREA" as mentioned in the above, it becomes possible to conduct the line width adjusting operation in regard to the desired line width and the desired image area. Further, it is needless to say that it is applicable to employ the value of "CONVERSION VALUE=(WHITE OR BLACK)", the value of "SYMMETRY INFORMATION (SW=)" or "OBJECTIVE AREA", which are described in the program in advance.

FIG. 12 shows a flowchart of an edge detecting operation and a pixel-value conversion processing. The determining section 12, included in the control section 11, extracts an area corresponding to the template including the target pixel at its center, namely, the pixel values in a range of 7 pixels×11 pixels in this example (Step S201). However, in the above processing, each of the pixels represented by the image data is established as the target pixel, and, with respect to the target pixels extracted, the processing are sequentially conducted one by one in order of them.

Successively, the determining section 12 reads out the data of the template in order of "No." (Step S202, Step S203). Further, in Step S204, the determining section 12 compares the extracted pixel value with the data of the template read out. At this time, when the data of the first template is read out, the abovementioned comparison is conducted in the specific pixel determining section 121 to determine whether or not the extracted pixel is the specific pixel, while, when the data of the second template is read out, the abovementioned comparison is conducted in the edge pixel determining section 122 to determine whether or not the extracted pixel is the edge pixel.

In this example, the templates shown in FIGS. 3(a)-3(d) through FIG. 7 are employed. Further, according to the values indicted in the columns of "No." of them, the comparing and determining operations of the line image having a two pixels width, the line image having a three pixels width or more pixels width and the diagonal line image are conducted in this order, with respect to the first template and the second template in this order. Further, the first template is employed to determine whether or not the target pixel is the specific pixel, and then, if the target pixel is not the specific pixel, the second template is employed to determine whether or not the target pixel is the edge pixel. Further, it is also applicable that, irrespective of the order of the line image having a two pixels width, the line image having a three pixels width or more pixels width and the diagonal line image, the first template is initially employed to determine whether or not the target pixel is the specific pixel, and then, if the target pixel is not the specific pixel, the second template is secondarily employed to determine whether or not the target pixel is the edge pixel.

Further, when the value included in the column of "SYMMETRY INFORMATION (SW=)" indicates a use of the symmetry type template, the data of the symmetry type template is created according to the value of "SYMMETRY INFORMATION (SW=)" and is employed for the comparing and determining operations. Further, when the value of "SYMMETRY INFORMATION (SW=)" is "0", namely, indicating a nonuse of the symmetry type template, the processing enters into Step S207.

When the extracted pixel value coincides with the data of the template, namely, when the target pixel is the specific pixel or the edge pixel (Step S206, Yes), the line width adjusting section 13 converts the specific pixel to the black pixel when the target pixel is the specific pixel, while, the line width adjusting section 13 converts the edge pixel to the white pixel when the target pixel is the edge pixel (Step S209). Further, when the target pixel is not included in the objective area (Step S206, No), the target pixel is kept as it is (Step S210).

According to the abovementioned procedure in which the first template and the second template are employed to conduct the comparing and determining operations in accordance with the order of the values indicated in the columns of "No.", since the comparing operations employing other templates are not conducted when once the target pixel has been determined as either the specific pixel or the edge pixel, it becomes possible to shorten the processing time to be consumed.

Further, when the extracted pixel value does not coincide with the data of the template (Step S205, No), and, when the data of the template to be compared still exist (Step S205, Yes), the determining section 12 reads out the data of the template of next "No." (Step S208, Step S203), and conducts the comparing operation so as to determine the target pixel as either the specific pixel or the edge pixel, or as none of them. On the other hand, when the comparing operations in regard to all of the templates are completed (Step S207, No), the target pixel can be determined as neither the specific pixel nor the edge pixel, the line width adjusting section 13 leaves the pixel value of the target pixel as it is (Step S210).

When the comparing operations between all of the target pixels and the templates are completed, the processing of this flowchart is finalized (Step S211, Yes).

Further, when the objective area is not necessary, since Step S206 is unnecessary, the processing of this flowchart is conducted in such a manner that the processing is directly shifted from Step S205 to Step S209.

Second Embodiment

The image processing apparatus embodied in the present invention as the second embodiment will be detailed in the following. In this connection, although the configuration of the second embodiment is the similar to that of the first embodiment, the comparison procedures to be conducted by the determining section 12 in both of them are different from each other.

In the foregoing, it has been exemplified as the first embodiment that the determining section 12 conducts the comparing and determining operations in order of the values indicated in "No." from the first templates to the second templates, and, when the target pixel is determined as either the specific pixel or the edge pixel, the line width adjusting section 13 converts the pixel value of the target pixel. On the other hand, the second embodiment is so constituted that the determining section 12 conducts the comparing and determining operations with respect to all of the templates, and then, the line width adjusting section 13 converts the pixel value of the target pixel, based on the results of the determining operations.

(Operating Mode)

Figure 13:
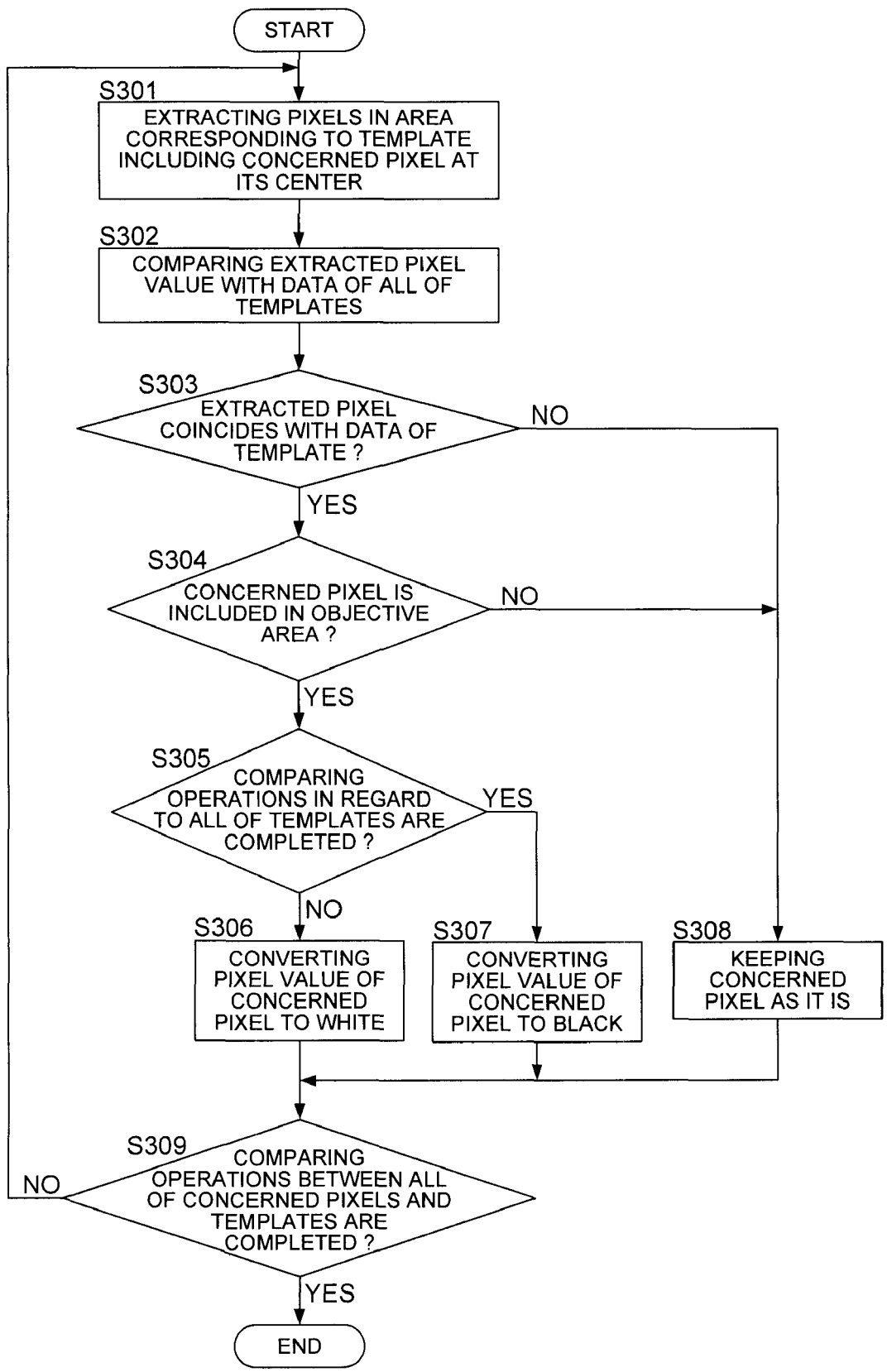
FIG. 13 shows a flowchart indicating still another operating mode in an image processing apparatus embodied in the present invention as a second embodiment.

Next, referring to FIG. 13, an example of the operating mode in the image processing apparatus embodied in the present invention as the second embodiment will be detailed in the following. FIG. 13 shows a flowchart indicating the operating mode in the image processing apparatus of the second embodiment.

As shown in FIG. 13, as well as the first embodiment, the determining section 12, included in the control section 11, extracts an area corresponding to the template including the target pixel at its center, namely, the pixel values in a range of 7 pixels×11 pixels in this example (Step S301).

Successively, the determining section 12 compares the extracted pixel value with the data of the template (Step S302), and successively, with the data of all of the templates. However, use or nonuse of the template and use or nonuse of the symmetry type template are determined according to the value indicated by the column of "SYMMETRY INFORMATION (SW=)".

When the extracted pixel value coincides with the data of the template (Step S303, Yes) and when the target pixel is included in the objective area (Step S304, Yes), the line width adjusting section 13 of the determining section 12 converts the pixel value of the target pixel to "white". When the extracted pixel value coincides with the data of the template (Step S303, Yes), when the target pixel is included in the objective area (Step S304, Yes) and when the target pixel is edge pixel (when only coinciding with the second template), the line width adjusting section 13 converts the pixel value of the target pixel to "white". When the determined results are the edge pixel and the specific pixel (when coinciding with both the first template and the second template) (Step S305, Yes), the line width adjusting section 13 converts the pixel value of the target pixel to "black" (Step S307). Further, when the target pixel is not included in the objective area (Step S304, Yes), the target pixel is kept as it is (Step S308). Still further, when the extracted pixel value does not coincide with the data of the template (Step S303, No), the line width adjusting section 13 leaves the pixel value of the target pixel as it is (Step S308).

According to the image processing apparatus embodied in the present invention, since the determining operation of the target pixel is conducted by employing not only a template for detecting a specific pixel having continuity with both an edge pixel and a specific black pixel, but also another template for detecting an edge pixel, so as to convert the target pixel determined as the specific pixel to a black pixel, or, so as to convert the target pixel, determined as the edge pixel instead of the specific pixel, to a white pixel, it becomes possible not only to conduct the line width adjusting operation while keeping continuity with the specific black pixel, but also to easily conduct the line width adjustment of the line image without deteriorating the image quality.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus that adjusts a width of a line image constituted by predetermined black pixels in a binary image including both white pixels and black pixels, comprising:
    a memory device, controlled by a processor, to store a first template for detecting a specific pixel that is an edge pixel of the line image and has a continuity with a specific black pixel, and a second template for detecting the edge pixel of the line image;
    a first determining section to determine whether or not a target pixel is the specific pixel, based on the first template stored in the memory device;
    a second determining section to determine whether or not the target pixel is the edge pixel, based on the second template stored in the memory device; and
    a line width adjusting section to adjust the width of the line image, in such a manner that the line width adjusting section converts the target pixel to a black pixel, when the first determining section determines that the target pixel is the specific pixel, while the line width adjusting section converts the target pixel to a white pixel, when the first determining section determines that the target pixel is not the specific pixel and the second determining section determines that the target pixel is the edge pixel.

2. The image processing apparatus of claim 1,
    wherein the second determining section determines whether or not the target pixel is the edge pixel, based on the second template, after the first determining section determines that the target pixel is not the specific pixel.

3. The image processing apparatus of claim 1,
    wherein the first template is constituted by a first black pixel located at a first predetermined position, at least one of a first white pixel located adjacent to the first black pixel and the specific black pixel having a continuity with the black pixel, which are disposed within a first predetermined area; and
    wherein the first determining section determines that the target pixel is the specific pixel, when the target pixel is located at the first predetermined position and first pixels residing within the first predetermined area coincide with the first black pixel, the first white pixel and the specific black pixel, constituting the first template; and wherein the second template is constituted by a second black pixel located at a second predetermined position, and at least one of a second white pixel located adjacent to the second black pixel, which are disposed within a second predetermined area; and wherein the second determining section determines that the target pixel is the edge pixel, when the target pixel is located at the second predetermined position and second pixels residing within the second predetermined area coincide with the second black pixel and the first white pixel, constituting the second template.

4. The image processing apparatus of claim 3, further comprising:

a symmetrical template creating section to create a first symmetrical template in which a layout of binary pixels is symmetric to that in the first template and a second symmetrical template in which the layout of binary pixels is symmetric to that in the second template;

wherein the first determining section employs both the first template, stored in the memory device, and the first symmetrical template, created by the symmetrical template creating section, to determine whether or not the target pixel is the specific pixel; and wherein the second determining section employs both the second template, stored in the memory device, and the second symmetrical template, created by the symmetrical template creating section, to determine whether or not the target pixel is the edge pixel.

5. The image processing apparatus of claim 4, wherein the first template and the first symmetrical template are symmetric with respect to either a point or a line; and wherein the second template and the first symmetrical template are symmetric with respect to either a point or a line.

6. The image processing apparatus of claim 1, further comprising:

an inputting section to input an instruction instructed by an operator;

wherein each of the first determining section and the second determining section receives the instruction, indicating use or nonuse of a specific template, from the inputting section, and employs the specific template, use of which is indicated by the instruction.

7. The image processing apparatus of claim 1, wherein the line width adjusting section adjusts the width of the line image with respect to an objective area designated in advance.

8. The image processing apparatus of claim 7, wherein the objective area is either a character area or a photographic area.

9. An image processing method for adjusting a width of a line image constituted by predetermined black pixels in a binary image including both white pixels and black pixels, comprising:

storing in advance a first template for detecting a specific pixel that is an edge pixel of the line image and has a continuity with a specific black pixel, and a second template for detecting the edge pixel of the line image;

determining whether or not a target pixel is the specific pixel, based on the first template;

determining whether or not the target pixel is the edge pixel, based on the second template;

converting the target pixel to a black pixel, when determining that the target pixel is the specific pixel in the determining step based on the first template; and converting the target pixel to a white pixel, when determining that the target pixel is not the specific pixel in the determining step based on the first template, and when determining that the target pixel is the edge pixel in the determining step based on the second template.

10. An image processing method for adjusting a width of a line image constituted by predetermined black pixels in a binary image including both white pixels and black pixels, comprising:

storing in advance a first template for detecting a specific pixel that is an edge pixel of the line image and has a continuity with a specific black pixel, and a second template for detecting the edge pixel of the line image;

determining whether or not a target pixel is the specific pixel, based on the first template;

converting the target pixel to a black pixel, when determining that the target pixel is the specific pixel in the determining step based on the first template;

determining whether or not the target pixel is the edge pixel, based on the second template, when determining that the target pixel is not the specific pixel in the determining step based on the first template; and converting the target pixel to a white pixel, when determining that the target pixel is the edge pixel in the determining step based on the second template.

* * * * *